United States Patent [19]
Guido et al.

[11] Patent Number: 5,638,798
[45] Date of Patent: Jun. 17, 1997

[54] METHOD AND SYSTEM FOR GENERATING IGNITION COIL CONTROL PULSES

[75] Inventors: Samuel James Guido, Dearborn; Rollie Morris Fisher; John Mark Wilson, both of Trenton, all of Mich.; Micah Charles Knapp, New Haven, Conn.; Gary Lynn Miller; Philip Enqirue Madrid, both of Round Rock, Tex.; Rudolf Bettelheim, Buda, Tex.

[73] Assignees: Ford Motor Company, Dearborn, Mich.; Motorola, Inc., Schaumburg, Ill.

[21] Appl. No.: 618,048

[22] Filed: Mar. 25, 1996

[51] Int. Cl.⁶ ............................................. F02P 5/15
[52] U.S. Cl. ..................... 123/609; 123/417; 364/431.12
[58] Field of Search ...................... 123/414, 416, 123/417, 609, 643; 364/431.04, 431.05, 431.12

[56] References Cited

U.S. PATENT DOCUMENTS 4,690,122  9/1987  Sasakura et al. .................. 123/609
4,796,208  1/1989  Kumagai et al. .................. 123/414 X Primary Examiner—Tony M. Argenbright
Attorney, Agent, or Firm—Peter Abolins; Roger L. May

[57] ABSTRACT

A method and system for generating an ignition coil output signal to control charging and discharging of a plurality of ignition coils in an internal combustion engine. A plurality of holding registers asynchronously receive a plurality of ignition coil data from a processor. The plurality of holding registers are memory-mapped and store the plurality of ignition coil data until subsequent ignition coil data is received from the processor. A sensor is provided for determining a position of the engine and generating a corresponding engine signal. A plurality of match registers are coupled to the plurality of holding registers for comparing the ignition coil data with a reference signal and generating an ignition coil output signal for receipt by one of the plurality of ignition coils based on the engine signal and the comparison between the ignition coil data and the reference signal.

20 Claims, 7 Drawing Sheets

Fig. 8

| Bit Number: | | | | | | | | | | | | | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |
| Res | COE | FECTB | | | SECTB | | | 12/16U | 12/16L | FEMTB | | | SEMTB | | |
| 0 | 0 | 0 | 0 | 0 | 0 | 0 | 0 | 0 | 0 | 0 | 0 | 0 | 0 | 0 | 0 |

Reset:

| Bit Number: | | | | | | | | | | | | | | | |
|---|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 | 31 |
| DOCI | DTB | | | | Res | CC | | Res | CSTU | CSTL | CLKU | | | CLKL | |
| 0 | 0 | 0 | 0 | 0 | 0 | 0 | 0 | 0 | 0 | 0 | 0 | 0 | 0 | 0 | 0 |

Reset:

Fig. 9

| Bit Number: | | | | | | | | | | | | | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |
| CLU | | CLL | | CYIE | | TOCI | DMXC | DMXL | | | | | | | |
| 0 | 0 | 0 | 0 | 0 | 0 | 0 | 0 | 0 | 0 | 0 | 0 | 0 | 0 | 0 | 0 |

Reset:

| Bit Number: | | | | | | | | | | | | | | | |
|---|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 | 31 |
| MDME/RSEME | | | RFEME | | SEME | | Res | FEME | | FFEM | FSEM | RFFEM | FMDM/RFSEM | CE | RS |
| 0 | 0 | 0 | 0 | 0 | 0 | 0 | 0 | 0 | 0 | 0 | 0 | 0 | 0 | 0 | 0 |

Reset:

Fig. 10

| Bit Number: | | | | | | | | | | | | | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |
| DMXS | | | | | | | | IZSU | IZSL | FECS | SECS | FEMS | SEMS | RFEMS | MDMS/RSEMS |
| 0 | 0 | 0 | 0 | 0 | 0 | 0 | 0 | 0 | 0 | 0 | 0 | 0 | 0 | 0 | 0 |

Reset:

| Bit Number: | | | | | | | | | | | | | | | |
|---|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 | 31 |
| CIS | MDTS | FECF | SECF | FEMF | SEMF | RFEMS | MDMF/RSEMF | RESERVED | | | | | | | |
| 0 | 0 | 0 | 0 | 0 | 0 | 0 | 0 | 0 | 0 | 0 | 0 | 0 | 0 | 0 | 0 |

Reset:

METHOD AND SYSTEM FOR GENERATING IGNITION COIL CONTROL PULSES

CROSS-REFERENCE TO RELATED APPLICATION

This application is related to U.S. patent application Ser. No. 08/618,047 entitled "Method and System for Generating A Fuel Pulse Waveform" filed on the same day as the present application and having the same assignee.

TECHNICAL FIELD

This invention relates to methods and systems for generating ignition coil control pulses to control the charging and discharging of a plurality of ignition coils.

BACKGROUND ART

In an automobile engine, ignition sparks must be generated at exact engine positions to reduce exhaust emissions, increase engine power, and increase fuel efficiency.

In many automobile engines, there can be more than one spark ignition coil, either one coil for two cylinders or one coil for each cylinder. Each coil must be "active", i.e., the ignition coil control signal is asserted, for it's charge time and then discharged, i.e, a transition of the ignition coil control signal from the asserted state to the negated state, at a specific engine position. Usually, the charge time for a spark ignition coil is much shorter than the time it takes for the engine to rotate through an entire engine cycle, i.e., 720 degrees of rotation. Therefore, most ignition coil charge times need not overlap with each other so that while one coil is being charged, most of the other coils are inactive.

The known prior art includes a processor having a dynamic output stack, as shown in FIG. 1. The output stack includes a plurality of non-memory mapped Random Access Memory (RAM) arrays 10 each having a command portion 10a and a time value portion 10b. The command portion 10a is directly coupled to a demultiplexer 11. The time value portion 10b is directly coupled to a comparator 12 whose output is coupled to the demultiplexer 11. A programming register 13 is used to determine which RAM array 10 is to be selected by the demultiplexer 11. Several different external events can then be triggered using the system of the prior art. Once an output event is executed, the output item is deleted from the stack. Thus, processor intervention is constantly required to attend the hardware to maintain output pulses.

Furthermore, known prior art systems distribute the ignition coil control pulses by either using a mechanical device that switches from one ignition coil to the next based on engine position, by having dedicated hardware to generate each ignition coil control signal, or by requiring the CPU's assistance in switching to a new ignition coil, i.e., the CPU must re-program the hardware to drive a new output when a particular engine position is reached.

A need exists, therefore, for a method and system for generating ignition coil control pulses synchronized to engine position. The known prior art also fails to provide a method and system for distributing the ignition coil control pulses to the ignition coils without the use of external hardware or a processor. The known prior art further fails to provide a method and system for generating single or multiple ignition coil control pulses to one or more ignition coils in one or more engine cycles without processor assistance.

DISCLOSURE OF THE INVENTION

A general object of the present invention to provide a method and system for efficiently generating ignition coil control pulses for a plurality of ignition coils with minimum processor assistance.

In carrying out the above object and other objects, features and advantages, of the present invention, a method is provided for generating ignition coil control pulses. The method includes the step of providing a plurality of memory-mapped holding registers adapted to asynchronously receive a plurality of ignition coil data from a processor and for storing the plurality of ignition coil data until subsequent ignition coil data is received from the processor. Still further, the method includes the step of providing a plurality of match registers coupled to the plurality of holding registers for comparing the ignition coil data with a reference signal. The method further includes the step of determining a position of the engine and generating a corresponding engine position signal. The method also includes the step of generating the ignition coil output signal for receipt by one of the plurality of ignition coils based on the comparison and the engine position signal.

In further carrying out the above object and other objects, features and advantages, of the present invention, a system is also provided for carrying out the steps of the above described method. The system includes a plurality of memory-mapped holding registers adapted to asynchronously receive a plurality of ignition coil data from a processor and for storing the plurality of ignition coil data until subsequent ignition coil data is received from the processor. The system also includes a sensing device for sensing the position of the engine and for generating a corresponding engine signal. Still further, the system includes a plurality of match registers coupled to the plurality of holding registers for comparing the ignition coil data with a reference signal and for generating the ignition coil output signal for receipt by one of the plurality of ignition coils based on the comparison and the engine position signal.

The above object and other objects, features and advantages of the present invention are readily apparent from the following detailed description of the best mode for carrying out the invention when taken in connection with the accompanying drawings.

BRIEF DESCRIPTION OF THE DRAWINGS

FIG. 8 is a diagram of the Spark Integrated Channel Control Register 0;

FIG. 9 is a diagram of the Spark Integrated Channel Control Register 1;

FIG. 10 is a diagram of the Spark Integrated Channel Status Register; and

BEST MODES FOR CARRYING OUT THE INVENTION

Figure 1:
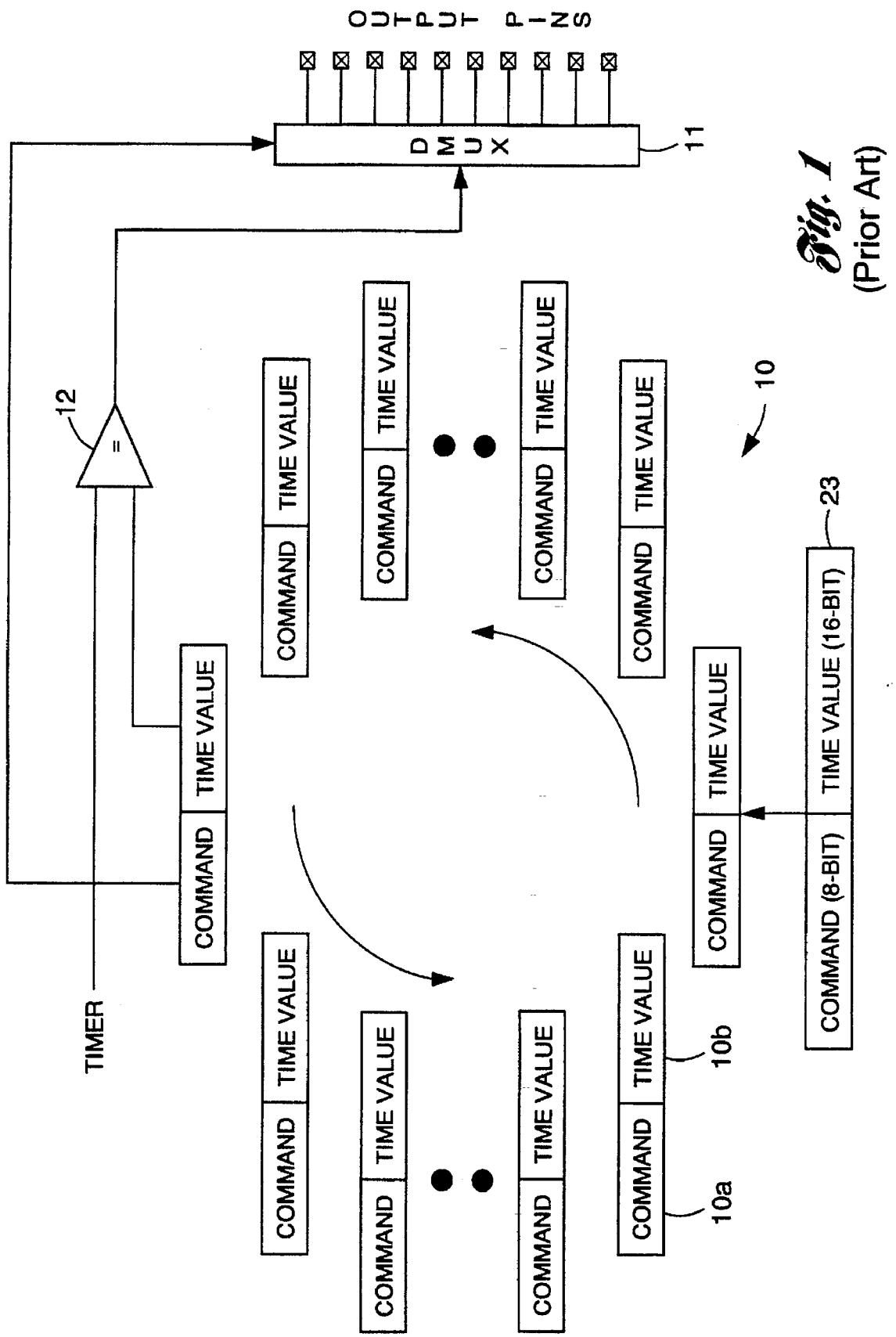
FIG. 1 is a block diagram of a prior art processor hardware used to generate a ignition coil control waveform.
Figure 2:
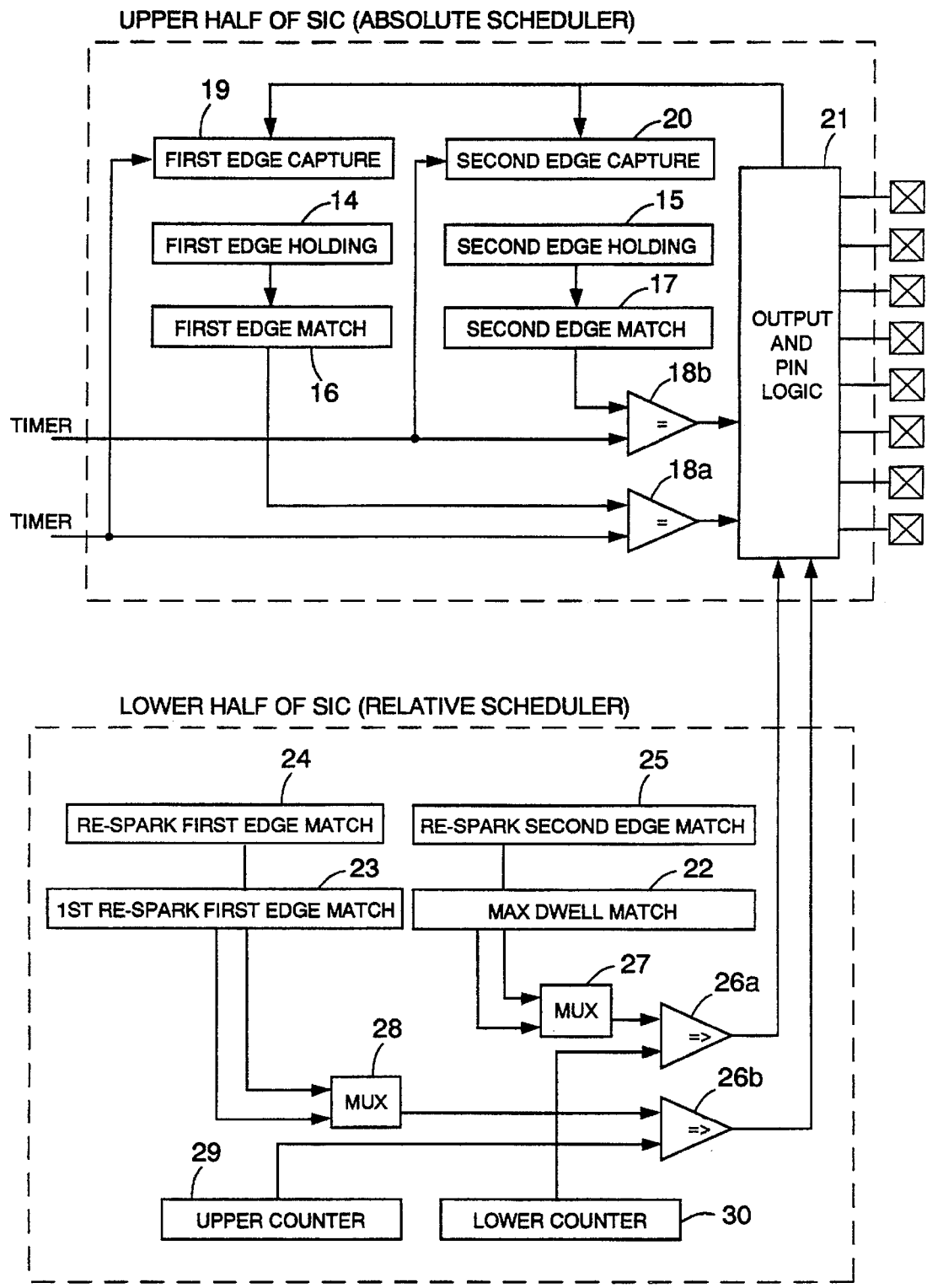
FIG. 2 is a general block diagram of a processor hardware of the present invention for generating the ignition coil control waveform.

Turning now to FIG. 2, there is shown a simplified block diagram of a processor hardware of the Spark Integrated Channel (SIC) of the present invention for generating an ignition coil waveform. The hardware includes a first edge holding register 14 and a second edge holding register 15 for receiving ignition coil control data from a command register (not shown). The ignition coil control data contained in the first holding register 14 and the second holding register 15 are transferred to a first edge match register 16 and a second edge match register 17, respectively. The first edge holding register 14 and the second edge holding register 15 allow the processor to asynchronously load the values for the next pulse event. The output of the first edge holding register 14 and the second edge holding register 15 are connected to the first edge match register 16 and the second edge match register 17, respectively.

The output of the first edge match register 16 and the second edge match register 17 are each coupled to a comparator 18a, 18b, respectively, for comparing the ignition pulse data with a reference signal. This reference signal may be either a timebase signal or an angle signal. The first edge holding register 14 and the second edge holding register 15 are memory-mapped and store the ignition pulse data until subsequent ignition pulse data is received from the processor. Thus, processor intervention is minimized. The SIC also includes a first edge capture register 19 and a second edge capture register 20 for capturing the time of each edge of the ignition coil control pulses. Still further, the SIC includes an output logic demultiplexer 21 for generating the silicon distribution function. The output logic 21 drives different output pins based on the value of the angle base that is driving the SIC.

The SIC can be programmed to produce the same ignition pulse sequence until engine conditions change in which the processor transfers new ignition pulse data to the holding registers 14,15. This portion of the SIC can be logically thought of as an absolute scheduler.

The lower half of the SIC contains a relative scheduler, which is relative to the events produced from the first edge match register 16 and the second edge match register 17. This hardware includes a maximum dwell register 22, a 1st re-spark first edge match register 22, a re-spark first edge match register 24 and a re-spark second edge match register 25. The main ignition pulse data is contained in the maximum dwell register 22. The other three registers are used only for re-spark functionality. The four registers are grouped into two pairs of registers that each share a greater-than or equal-to comparator 26a, 26b. The maximum dwell register 22 and the second re-spark edge register 25 share the comparator 26a via first multiplexer 27 and the 1st re-spark first edge register 23 and the re-spark first edge register 24 share the second comparator 26b via a second multiplexer 28. These comparators 26a, 26b are used to compare the register data with the local timebase signal generated by an upper counter 29 and a lower counter 30. The first maximum dwell register 22 and the second re-spark edge register 25 are compared to the lower counter 30 as a result of a pin transition from off to on. The lower counter 30 only counts while the pin is in the on state or while the ignition coil is in its on condition in which the coil is charging. The 1st re-spark first edge register 23 and the first re-spark edge register 24 are compared to the upper counter 29 as a result of a pin transition from on to off. The upper counter 29 only counts while the pin state is in the off state or while the ignition coil is being driven to its off condition in which the coil is not charging. It is at this point where an ignition spark is generated.

Figure 3:
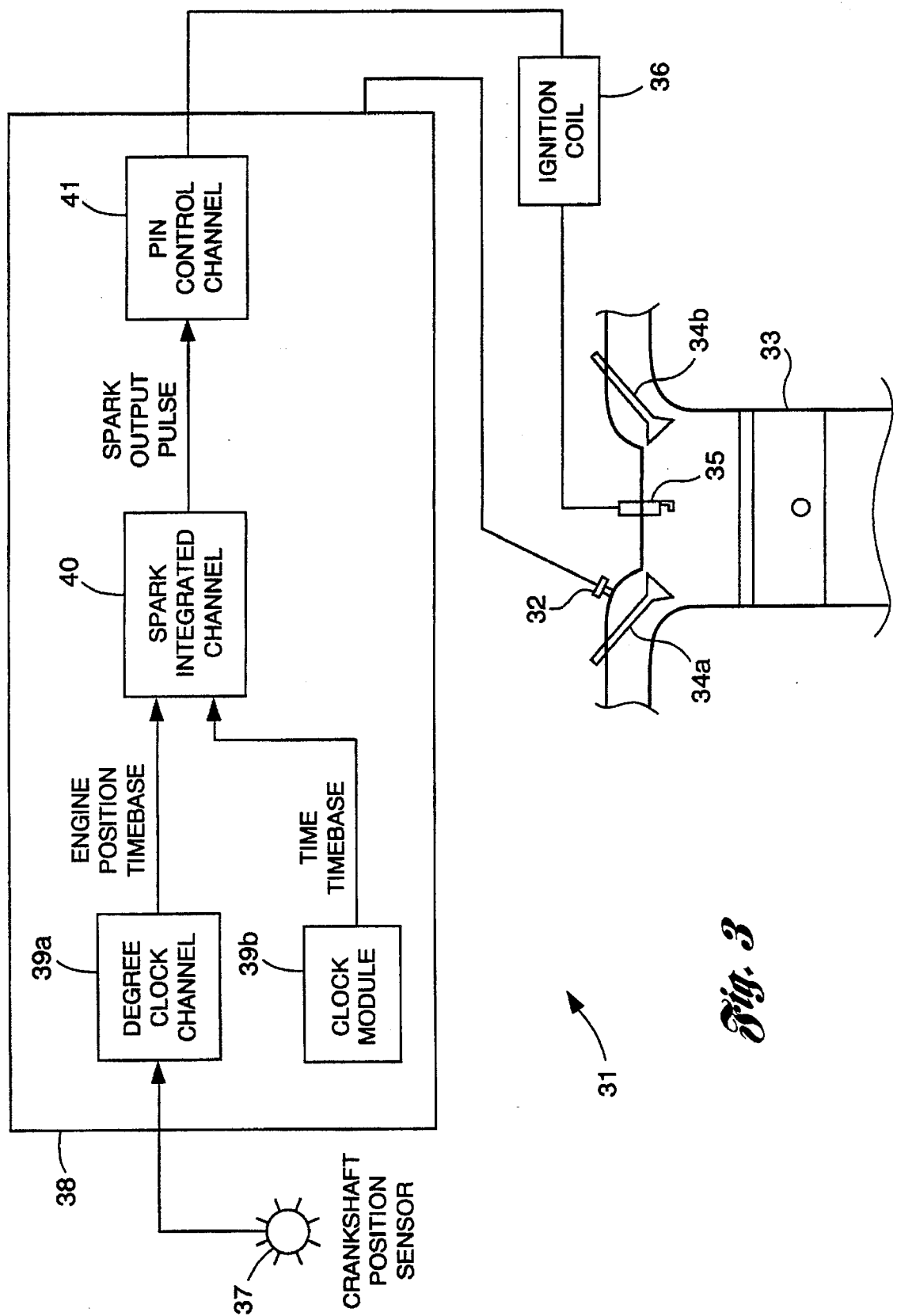
FIG. 3 is a schematic diagram of an ignition coil system incorporating the present invention.

Turning now to FIG. 3, there is shown a simplified schematic diagram of an ignition coil system, denoted generally by reference numeral 31, incorporating the present invention. Under normal operating conditions, fuel is delivered from a fuel source (not shown) through fuel lines (not shown) to at least one fuel injector or actuator 32. The fuel injector 32 is conventional and injects fuel from the fuel lines into at least one individual cylinder 33 of an internal combustion engine (not shown) of an automotive vehicle (not shown). The cylinder 33 also has one or more intake valves 34a and one or more exhaust valves 34b which are typical. Fuel from the fuel injectors 32 is mixed with air in the cylinders 33 in a known manner.

The system 31 further includes a spark plug 35 disposed in the cylinder 33. The spark plug 35 is utilized to ignite the fuel. The spark plug is ignited via an ignition coil 36.

A typical crankshaft position sensor 37 is provided for generating an engine position in an angle domain. The sensor 37, fuel injector 32, and ignition coil 36 are electrically connected to an electronic control unit (ECU) 38, or processor, including a clock module 39a for providing a time timebase and a degree clock channel 39b for providing an angle timebase. The ECU 38 further includes a Spark Integrated Channel (SIC) module 40 for determining the spark output pulse. A Pin Control Channel 41 is included in the ECU 38 for determining whether a pin line and/or status line is configured to be driven. The ECU 38 then generates an output signal to control the ignition coil 36 based on the spark output pulse determined by the SIC 40.

Figure 4:
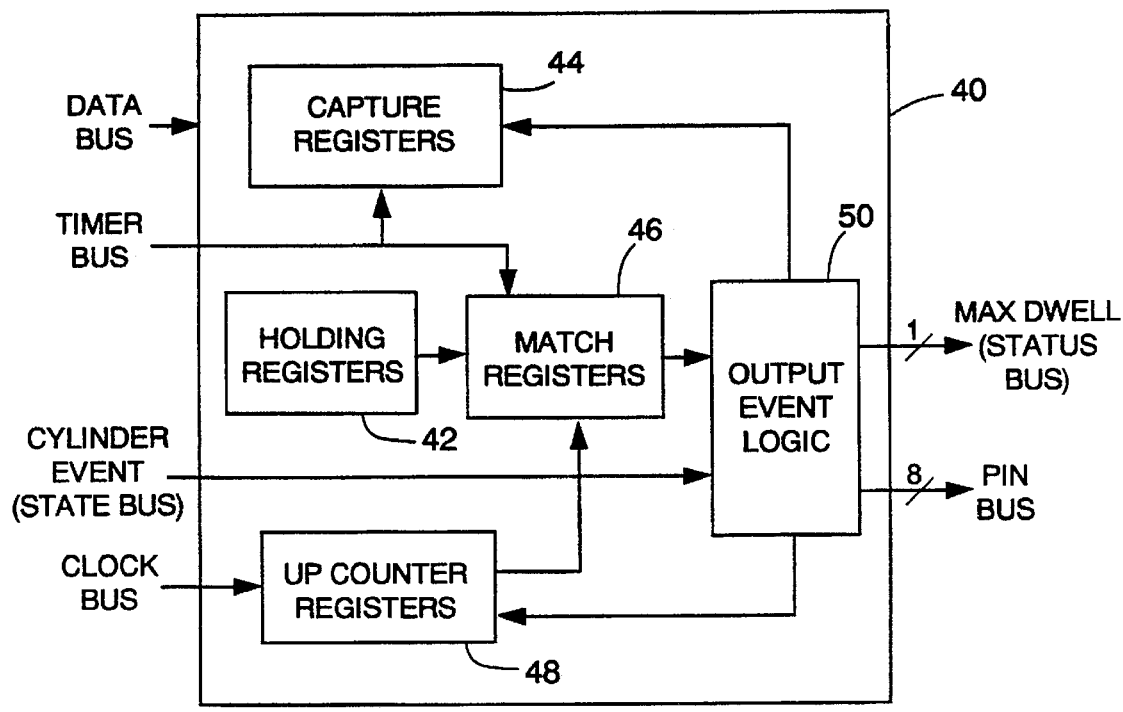
FIG. 4 is a simplified block diagram of the Spark Integrated Channel of the present invention.
Figure 5:
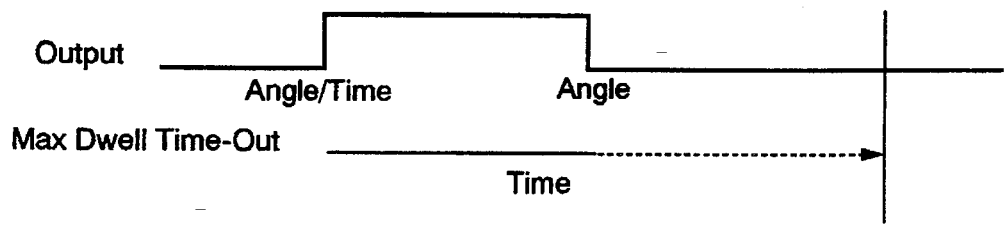
FIG. 5 is a waveform of a normal spark output pulse.

Referring now to FIG. 4, there is shown a simplified block diagram of the SIC 40. The SIC 40 supports two modes of operation: normal spark mode and repetitive spark mode. In the normal spark mode, the SIC 40 produces pulses based on engine angle. The SIC 40 produces one output pulse per cylinder input event with no CPU service required between pulses. An output pulse is normally specified by a first edge angle and the logical OR of a second edge angle and a max dwell time-out, as shown in FIG. 5. The position of the Max Dwell Match is shown where it would occur if the Second Edge Match event does not occur (i.e. if a Second Edge Match event does not occur, the output will remain high and Lower Counter will continue to increment until a Max Dwell Match event occurs as will be described below).

Figure 6:
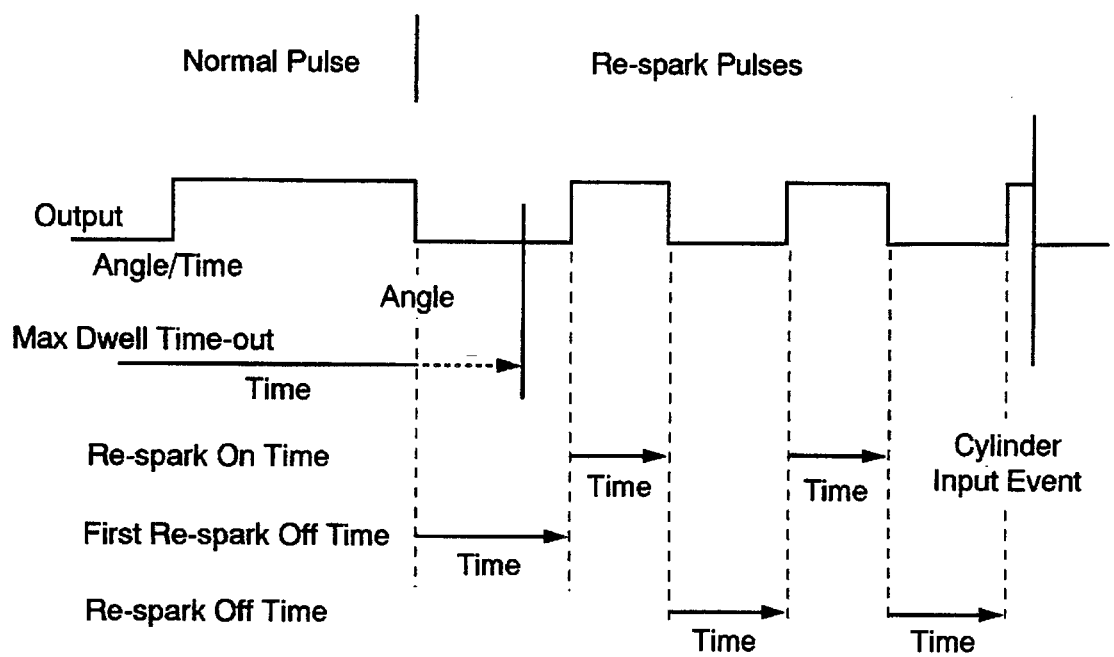
FIG. 6 is a waveform of a repetitive spark output pulse.

In the repetitive spark mode, the SIC 40 generates one normal spark pulse and then several smaller "re-spark" pulses. The cylinder event signal indicates that the SIC 40 must stop generating "respark" pulses. No CPU service is required to continue operating in repetitive spark mode. In repetitive spark mode, the normal pulse is specified by a first edge angle and the logical OR of a second edge angle and a max dwell time-out. The "re-spark" pulses are specified by three parameters: the off time duration of the pulse subsequent to the normal pulse, and the repetitive off time and on time durations of the pulse, as shown in FIG. 6.

The SIC 40 provides the capture, match and counting functions necessary to produce spark output pulses and support spark functionality on up to eight pins. Each edge of the spark output may be specified in time or angle. Pulse edges may also be captured as a programmable time or angle timebase.

The SIC 40 is composed of several registers. The SIC 40 includes holding registers 42 for storing the duration in time of the most recent spark output pulse. The SIC 40 also includes capture/holding registers 44 for capturing a time or angle timebase value when triggered by pin transitions. The capture/holding registers 44 may be enabled for single captures or enabled for continuous captures. The SIC 40 further includes match registers 46 for generating the output waveform and up counter registers 48 for providing a local timebase incremented by a clock. The value in an up counter register 48 is compared against the value in a match register 46 to produce timed output events. The output event logic 50 controls the mode and operation of the SIC 40 and controls the destination of all output events.

Figure 7:
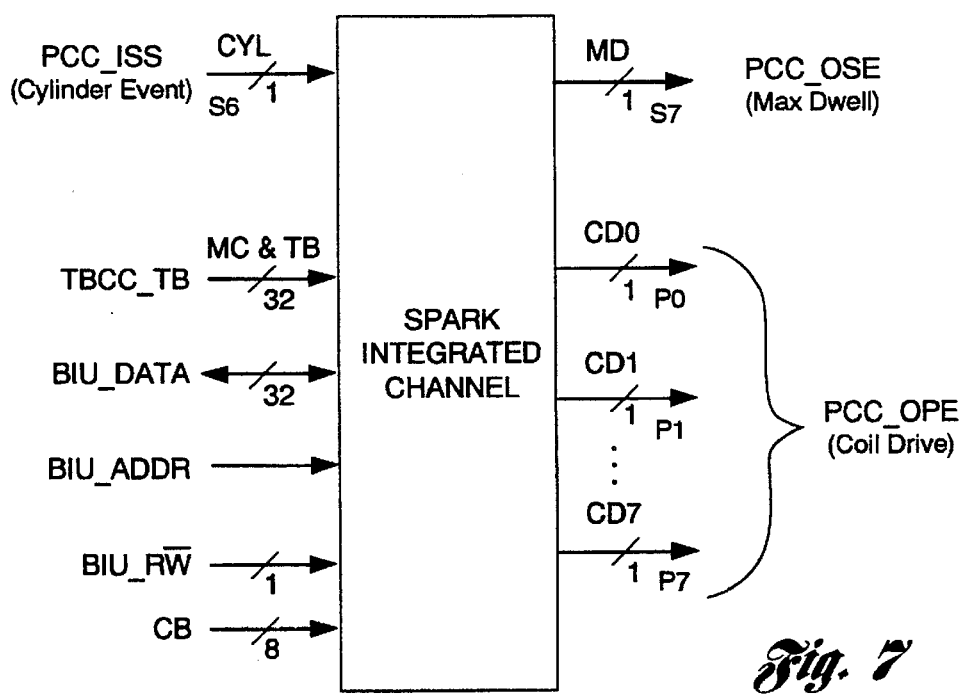
FIG. 7 is a schematic diagram illustrating the input and output signals associated with the Spark Integrated Channel of the present invention.

The relevant input and output signals associated with the SIC 40 are shown in FIG. 7. The Cylinder Event (i.e., PCC_ISS_InputSS—Pin Control Channel_Input Status State) is hardwired (mask programmed) to an Input Status State Bus line six (S6) and indicates the beginning of a new cylinder event. The Moduli Counter (TBCC MC—Timer Bus Control Channel_Moduli Counter) is a 4-bit signal that indicates the number of the present degree timebase moduli within the engine cycle (otherwise known as the number of the current cylinder pair in the engine cycle). This signal is encoded onto the upper four bits of a 16-bit degree timebase.

The Timer Bus (TBCC_TB) supplies eight different 16-bit or 32-bit timebases to the SIC 40. The eight different timebases are multiplexed onto the bus during individual time slots. Assignment of different timebases to the eight time slots is controlled by the Timer Bus Control Channel. The Bus Interface Unit-Data Bus (BIU_DATA) is a 32-bit bus used to transfer data to and from the registers of the SIC 40 by a bus master during a write and read cycle, respectively. Data can be accessed in byte (8-bit), half-word (16-bits), and word (32-bits) formats.

The Bus Interface Unit-Address Bus (BIU_ADDR) is used to select the appropriate register. The address bus is communicated to the Bus Interface Unit (BIU) from the Inter-Module Bus (IMB) and the lower order address lines are passed along to an address decode logic of the SIC 40. The Bus Interface Unit_Read/Write Signal (BIU_R/W) is generated by the bus master to indicate that either a read or a write operation is in progress. The Clock Bus (CB) contains eight different clock sources which can be individually selected for use by the SIC 40.

The Pin Control Channel_Output Pin Event (PCC_OPE) supplies eight timed, one bit signals used to control up to eight coils. These signals are hardwired (mask programmed) to Output Pin Event Lines. The Pin Control Channel_ Output Status Event (Max Dwell) (PCC_OSE) is a 1-bit signal indicating a dwell time-out (Max Dwell Match occurrence) has occurred. This signal toggles when a dwell time-out occurs. The Max Dwell signal is hardwired (mask programmed) to an Output Status Event Bus. The Pin Control Channel controlling the Max Dwell signal's status line may be programmed to generate interrupts to the CPU upon a Max Dwell toggle.

The SIC 40 is composed of fifteen registers: two 16-bit capture registers, two 16-bit holding registers, two 16-bit equal-to match registers, four 16-bit greater-than-or-equal-to match registers, two 16-bit up counters, two 32-bit control registers, and one 32-bit status register. A Memory Map associated with the SIC 40 is as follows:

| 0 | | 15 16 | 31 |
|---|---|---|---|
| $X00 | | Unimplemented | |
| $X04 | | SIC_CR0 | |
| $X08 | | SIC_CR1 | |
| $X0C | | Unimplemented | |
| $X10 | | Unimplemented | |
| $X14 | | SIC_SR | |
| $X18 | SIC_UCNT | | SIC_LCNT |
| $X1C | SIC_FEC | | SIC_SEC |
| $X20 | SIC_FEM | | SIC_SEM |
| $X24 | SIC_NFE | | SIC_NSE |
| $X28 | SIC_RFEM | | SIC_RSEM |
| $X2C | SIC_FRFEM | | SIC_MDM |
| $X30 | | Unimplemented | |
| $X34 | | Unimplemented | |
| $X38 | | Unimplemented | |
| $X3C | | Unimplemented | | where,

SIC_CR0: Control Register 0
SIC_CR1: Control Register 1
SIC—CR2: Status Register
SIC_UCNT: Upper Counter
SIC_LCNT: Lower Counter
SIC_FEC: First Edge Capture
SIC_SEC: Second Edge Capture
SIC_FEM: First Edge Match
SIC_SEM: Second Edge Match
SIC_NFE: Next First Edge
SIC_NSE: Next Second Edge
SIC_RFEM: Re-spark First Edge Match
SIC_RSEM: Re-spark Second Edge Match
SIC_FRFEM: First Re-spark First Edge Match
SIC_MDM: Max Dwell Match The registers of the SIC 40 are named based on the primary purpose of the registers. Each register is individually programmable and can therefore perform other functions besides the register's primary function. The X is the high order address that specifies a particular modules' address space in the memory map. Addresses shown are only intended to show the size and relative position of the registers.

There are five types of data registers within the SIC 40: capture, holding, equal-to-match, greater-than-or-equal-to match, and up counter. These data registers function as 16-bit registers in the SIC 40. Any two adjacent 16-bit registers (i.e. First Edge Capture and Second Edge Capture) may be accessed simultaneously as one 32-bit word. The control registers and status register (CR0, CR1, and CR2) are explained in greater detail below.

The First Edge Capture (FEC) and the Second Edge Capture (SEC) data registers capture timebases when triggered by selected output events. The capture registers may be enabled to perform several types of captures. The capture registers will only capture pin transitions generated by the SIC 40 (i.e. pin transitions generated by other channels will not cause captures). The SIC 40 does not use the Input Pin State lines to determine which edges generated by the SIC 40 caused pin transitions. Therefore, a capture of a pin transition generated by the SIC is defined as a capture register capturing a timebase upon the first occurrence of a selected output event only after the opposite output event has occurred. For example, the First Edge Capture captures pin transitions generated by the First Edge Match register. If the First Edge Match register is configured to generate rising edge output events, then the First Edge Capture register only captures rising edges that occur after a falling edge. If two rising edge output events were generated in succession, only the first output event generated would trigger a capture.

The Next First Edge (NFE) and the Next Second Edge (NSE) holding registers hold the next values to be used by the First Edge Match (FEM) and Second Edge Match (SEM) registers, respectively. At the occurrence of a qualified Cylinder Input Event, Next First Edge is transferred into First Edge Match and Next Second Edge is transferred into Second Edge Match. The Next First Edge and Next Second Edge registers make up a single 32-bit word within the memory map and can therefore be written simultaneously in one 32-bit write. This allows the holding registers to be updated coherently.

The First Edge Match (FEM) and Second Edge Match (SEM) data registers hold values that are compared against timebases from the timer bus with equal-to comparators. The data contained in these registers may be loaded from the Next First Edge and Next Second Edge holding registers upon a Cylinder Input Event or by a CPU write. When loaded by a CPU write, either register may be accessed as a 16-bit half word or both as a 32-bit word. However, when loaded by the holding registers, both match registers are loaded simultaneously as two 16-bit words.

The primary role of the equal-to match registers and their comparators in the SIC 40 is to determine precise timing of output events (this is conditioned on several control bit fields). A match comparator asserts that a match event has occurred when the value that the register holds is equal to the value of the timebase it is being compared against, resulting in a rising or falling edge output event. The match comparator only asserts a true compare when the values are equal.

Each of the two equal-to match registers have a match interlock. When an equal-to match register asserts a match event, it becomes "interlocked". An interlocked match register may not assert further match events until the interlock has been broken. In the SIC 40, an equal-to match interlock may be broken by any one of the following ways: a false compare (timebase value does not equal the match register value during a compare), the match register is disabled, a bus master write to the match register, a data transfer to the match register, reset, or upon disabling of the SIC 40.

There are four 16-bit greater-than-or-equal-to match data registers that "share" two 16-bit greater-than-or-equal-to comparators in the SIC 40. The two 16-bit comparators perform an unsigned greater-than-or-equal-to compare between two of the match data registers (either the Re-spark First Edge Match and Re-spark Second Edge Match registers or the First Re-spark First Edge Match and Max Dwell Match registers) and the Counters. The comparators have a maximum compare value of 65535.

The counters are compared to the values in the match registers to generate the output event. In this manner, the match registers are used to hold the time (or value) corresponding to when the output event is supposed to occur.

The Max Dwell Match (MDM) is the only greater-than-or-equal-to match data register used when the SIC 40 is in Normal Spark Mode. The First Re-spark First Edge Match (FRFEM), Re-spark First Edge Match (RFEM), and Re-spark Second Edge Match (RSEM) registers, along with the Max Dwell Match (MDM) register, are used during Repetitive Spark Mode. All four match data register may not operate at the same time because they share the two 16-bit greater-than-or-equal-to comparators and associated control and status bits. The Max Dwell Match and the First Re-spark First Edge Match can operate simultaneously or the Re-spark First Edge Match and the Re-spark Second Edge Match can operate simultaneously.

The greater-than-or-equal-to comparators only compare the match data registers to the Counters when the Counters are incrementing. Therefore, the First Re-spark First Edge Match and the Re-spark First Edge Match do not assert match events if Upper Counter is stopped or disabled. Also, the Max Dwell Match and the Re-spark Second Edge Match registers do not assert match events if Lower Counter is stopped or disabled.

The Upper Counter (SIC_UCNT) and the Lower Counter (SIC_LCNT) registers provide a local timebase incremented by one of the eight different clocks from the Clock Bus. The value in a Counter is compared against the value in a greater-than-or-equal-to match register to produce timed output events. The up counters are cleared upon being enabled (provided the counter has not been stopped in software and the SIC 40 is not being re-enabled) and may be disabled by software or hardware. The up counters are configured by software to be enabled on output levels (e.g. output level high).

A counter becomes enabled in two possible ways. The first way assumes the counter is already configured to count on a specific output level (e.g. output level high). When the output level transitions from low to high, the counter is enabled and cleared and begins to increment. The second way assumes the counter is initially disabled to count regardless of the output level. If the output level is high and the counter is then configured to count while the output is high, the counter is immediately enabled and cleared and begins to increment. The counter is subsequently disabled when either the output level changes or the associated greater-than-or-equal-to match register asserts a match event, whichever occurs first. A counter may be enabled but not cleared when the SIC 40 is being re-enabled after it had been disabled by the Disable On Cylinder Input Event bit field.

At initialization, the counters will not begin incrementing, regardless of the level of the pin(s) the SIC 40 is driving, until an edge has been generated by the SIC 40.

The SIC 40 has two 32-bit control registers and a 32-bit status register that contain the control and status bit fields. The control registers are partially implemented control registers which contain the control bits necessary to program the channel. The status register is a partially implemented status register which contains status bits that reflect the state of the SIC 40.

Status bits are used to signal the occurrence of various types of events within the SIC 40. Only the hardware of the SIC 40 can assert a status bit. Writing the asserted state to a status bit has no effect. To negate a status bit, it must be read in the asserted state, and the negated value written back to the bit. This method is termed the "standard mechanism." If the channel event which sets the status bit occurs between the time that the CPU reads that status and then negates the bit to clear it, the status bit remains asserted. This indicates that a new status event has occurred and that the CPU has not read from the register.

Turning now to FIG. 8, there is shown the bit field encoding of the Spark Integrated Channel Control Register 0, its reset states and in ambiguous cases, the data register to which the bit field refers, where:

COE: Cylinder Output Enable
    0 - no effect
    1 - generate output edge upon a Cylinder Input Event occurrence
FECTB: First Edge Capture Timebase
SECTB: Second Edge Capture Timebase
FEMTB: First Edge Match Timebase
SEMTB: End Angle Match Timebase
DTB: Demultiplexer Timebase
12/16U: 12/16-bit Match Upper (FEM)
12/16L: 12/16-bit Match Lower (SEM)
    0 - 16-bit matches
    1 - 12-bit matches
DOCI: Disable On Cylinder Input
    0 - no effect
    1 - disable SIC on Cylinder Input Event
CC: Capture Control
    00 - continuous captures-all pin transitions
    01 - single capture-first two pin transitions
    10 - capture normal pulse pin transitions only
    11 - capture all pin transitions until a cylinder input event
CSTU: Counter Stop Upper (UCNT)
CSTL: Counter Stop Lower (LCNT)
    0 - no effect/resume incrementing
    1 - stop counter and disable matches
CLKU: Clock Upper (UCNT)
CLKL: Clock Lower (LCNT)
    000 - System Clock / 2
    001 - 4MHz (crystal frequency)
    010 - Engineering Clock (1 MHz)
    011 - Engineering Clock / 4
    100 - Engineering Clock /16
    101 - Engineering Clock / 1024
    110 - Filtered CPS tooth event
    111 - Degree Clock Ticks FIG. 9 illustrates the bit field encoding of the Spark Integrated Channel Control Register 1, its reset states and in ambiguous cases, the data register to which the bit field refers, where:

CLU: Counter Level Upper (UCNT)
CLL: Counter Level Lower (LCNT)
    0X - disabled
    10 - count while output is low
    11 - count while output is high
CYIE: Cylinder Input Edge
    00 - disabled
    01 - rising edge
    10 - falling edge
    11 - both edges
TOCI: Transfer on Cylinder Input
    0 - prohibit transfer
    1 - transfer NFE/NSE to FEM/SEM on Cylinder Input Event
DMXC: Demultiplexer Control
    0 - user defined control of de-mux
    1 - automatic control of de-mux
DMXL: Demultiplexer Select Lines defines the value of the De-mux select lines
MDME/RSEME: Max Dwell Match Edge/Re-spark Second Edge Match Edge
    Max Dwell Match Edge (normal pulse):
        000 - MDM/RSEM disabled
        001 - rising edge to pin, no status toggle
        010 - falling edge to pin, no status toggle
        011 - falling edge to pin, no status toggle
        100 - no edge to pin, toggle status
        101 - rising edge to pin, toggle status
        110 - falling edge to pin, toggle status
        111 - falling edge to pin, toggle status
    Re-spark Second Edge Match Edge (re-spark pulses):
        X00 - disabled
        X01 - rising edge to pin
        X10 - falling edge to pin
        X11 - falling edge to pin
RFEME: Re-spark First Edge Match Edge (FRFEM/RFEM)
SEME: Second Edge Match Edge
FEME: First Edge Match Edge
    00 - disabled
    01 - rising edge to pin
    10 - falling edge to pin
    11 - falling edge to pin
FFEM: Force First Edge Match
FSEM: Force Second Edge Match
RFFEM: Re-spark Force First Edge Match (FRFEM/RFEM)
FMDM/RFSEM: Force Max Dwell Match/Re-spark Force Second Edge Match
    0 - no effect
    1 - force match event
CE: Capture Edge
    0 - FEC captures rising edges
        SEC captures falling edges
    1 - FEC captures falling edges
        SEC captures rising edges
RS: Repetitive Spark
    0 - normal spark mode
    1 - repetitive spark mode FIG. 10 illustrates the bit field encoding of the Spark Integrated Channel Status Register, its reset states and in ambiguous cases, the data register to which the bit field refers, where:

DMXS: Demultiplexer Select Line Status reflects the state of the De-mux select lines
IZSU: Increment to Zero Status Upper (UCNT)
IZSL: Increment to Zero Status Lower (LCNT)
    0 - counter has not overflowed
    1 - counter has overflowed
FECS: First Edge Capture Status
SECS: Second Edge Capture Status
    0 - capture has not occurred
    1 - capture has occurred
FEMS: First Edge Match Status
SEMS: Second Edge Match Status
RFEMS: Re-spark First Edge Match Status
MDMS/FSEMS: Max Dwell Match Status/Re-spark Second Edge Match Status
    0 - match has not occurred
    1 - match has occurred
CIS: Cylinder Input Status
    0 - cylinder input has not occurred
    1 - cylinder input has occurred
MDTS: Max Dwell Toggle Status
    0 - a toggle of the max dwell signal has not occurred
    1 - a toggle of the max dwell signal has occurred
FECF: First Edge Capture Flag
SECF: Second Edge Capture Flag
    0 - capture has not occurred
    1 - capture has occurred
FEMF: First Edge Match Flag
SEMF: Second Edge Match Flag
RFEMF: Re-spark First Edge Match Flag
MDMF/FSEMF: Max Dwell Match Flag/Re-spark Second Edge Flag
    0 - match event may have occurred but has been cleared
    1 - match event has occurred The following is a detailed description of all the bit fields separated into five broad categories with respect to channel operations: Data Movement, Input Event Qualification, Match Control, Counter Control, and Output Event Generation.

Data Movement And Control

The data movement control fields control the transfer of data into the First Edge Match and Second Edge Match registers, select the output event edges that trigger captures, select capture operation, provide capture status, and select the timebases for the match, capture, and TBCC_MC (Timer Bus Control Channel Moduli Count) value.

Figure 11:
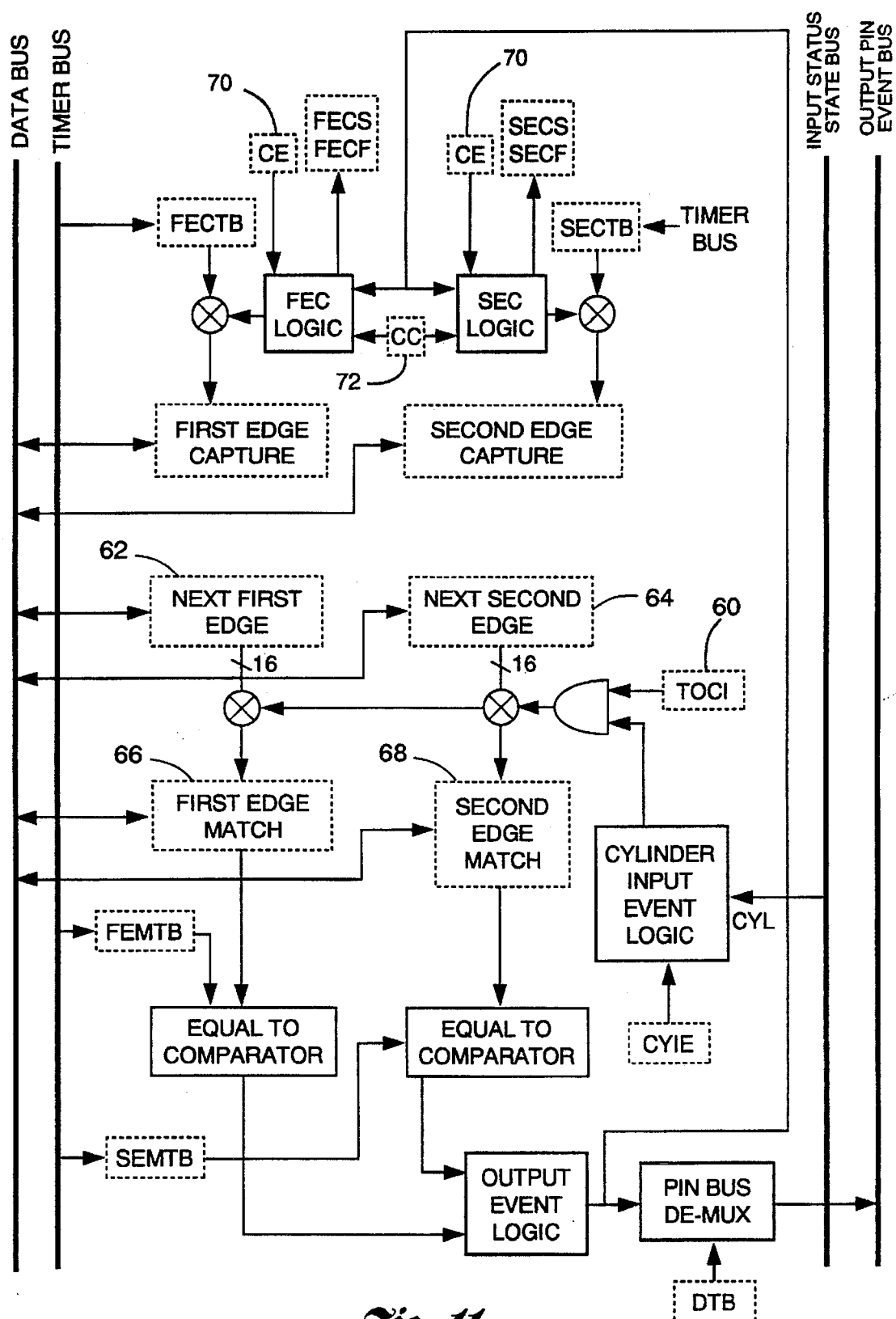
FIG. 11 is a schematic diagram of the data path associated with the Spark Integrated Channel of the system of the present invention.

The First Edge Capture and the Second Edge Capture registers capture time or angle bases upon selected output event edges. The logic associated with the data transfer bit fields is shown in FIG. 11, as will be described below.

The Transfer On Cylinder Input (TOCI) bit 60 enables a 32-bit transfer from the Next First Edge register 62 and the Next Second Edge register 64 into the First Edge Match register 66 and the Second Edge Match register 68, respectively. When set, the TOCI 60 enables the transfer to occur upon a Cylinder Input Event occurrence. When clear, no transfers will occur. If the CPU writes data directly to the match registers, instead of the holding registers, this bit should first be cleared to prevent the holding registers from overwriting the data. The TOCI 60 is cleared upon reset.

The Capture Edge (CE) bit 70 selects the output event edge that triggers the capture registers to capture a timebase from the Timer Bus. This bit field provides information to the entire SIC 40 on what edge (rising or falling) a first or second edge refers to and thus it must be programmed correctly in order to properly clear the Match Flag bit fields. The CE bit 70 is cleared upon reset.

The Capture Control (CC) bit field 72 selects which capture should be performed by the SIC 40. There are four types of captures in the SIC 40, namely: capture all pin transitions generated by the SIC 40, single capture (FEC and SEC each capture once), capture only normal pulse pin transitions (i.e. the re-spark pulse edges are not captured), and capture all pin transitions until a Cylinder Input Event. When the CPU programs the SIC 40 for single capture, the SIC 40 capture registers capture the next two pin transitions generated by the SIC 40.

If the CC bit field 72 is set to 01 or 11 the FECS and SECS bit fields are used to control captures. When the CC bit field is set to 01 or 11, the FECS and SECS bit fields are simultaneously cleared by hardware. A CPU service to clear the FECS or SECS bit, using the standard mechanism, is necessary to re-enable the First Edge Capture or the Second Edge Capture registers respectively when the CC bit field has been set to 01 or 11. As well as clearing the Capture Status bits, if the capture registers are disabled (i.e. CC is 01 or 11 and two captures have occurred or a Cylinder Input Event has occurred, respectively), the capture registers are re-enabled by writing the Capture Control bit field to a different mode (i.e. if CC is set to single captures, setting CC to continuous captures would re-enable the capture registers). The Capture Control bit field is cleared upon reset.

| Capture Control | | Capture Function |
|---|---|---|
| 0 | 0 | capture all pin transitions generated by the SIC |
| 0 | 1 | single capture, capture next two pin transitions |
| 1 | 0 | capture only normal pulse pin transitions |
| 1 | 1 | capture all pin transitions until a Cylinder Input Event |

If the CC bit field is set to 11, the CPU should clear the Cylinder Input Status (CIS) bit. Since captures are disabled on a Cylinder Input Event, the CPU needs to know when the Cylinder Input Event occurs, i.e. Cylinder Input Event occurrences set the CIS bit. Therefore, the CPU must clear the CIS bit when setting the CC bit field to 11 and pole the CIS bit to determine when the captures are disabled.

The FECS and SECS are status bits which indicate the occurrence of a First Edge Capture event and Second Edge Capture event, respectively. A FECS or SECS bit is set upon the occurrence of a capture and remains set until a CPU services clears it. The standard mechanism is used to clear the FECS and SECS bits. This CPU service to clear FECS and SECS is required to re-enable the capture registers when the Capture Control (CC) bit field is set to 01 to 11. Also, the FECS and SECS bit fields are simultaneously cleared by hardware when the Capture Control (CC) bit field is set to 01 or 11. FECS and SECS are cleared upon reset.

The capture edge flag bits, FECF and SECF, are flag bits which indicate the occurrence of a First Edge Capture event and a Second Edge Capture event, respectively. However, the FECF and SECF bits do not act as status bits which require a CPU service to clear. An FECF or SECF bit is set upon the occurrence of a capture event and remains set until the hardware clears it. These bits provide recent status of the capture registers without requiring the CPU to clear them after each capture. Therefore, these bits are read-only to the CPU.

Since the SECF is set upon a second edge capture, it is cleared upon a first edge capture. Since the FECF is set upon a first edge capture, it is cleared upon a second edge capture. DOCI has no affect on either the setting or the clearing of these bits. FECF and SECF are cleared upon reset.

The Capture Timebase (FECTB and SECTB) bit fields provide independent control of the timebase associated with the capture registers. These bits choose which of the eight timebases on the Timer Bus (TB) are captured. The FECTB and SECTB bit fields control the First Edge Capture and Second Edge Capture registers, respectively. The FECTB and the SECTB bit fields are cleared upon reset.

The Match Timebase (FEMTB and SEMTB) bit fields provide independent control of the timebase associated with the equal-to match registers. These bits choose which of the eight timebases on the Timer Bus (TB) are used for comparison. The FEMTB and SEMTB bit fields control the First Edge Match and Second Edge Match registers, respectively. The FEMTB and the SEMTB bit fields are cleared upon reset.

The Demultiplexer Timebase (DTB) bit field specifies which of the eight timebases correspond to the 16-bit degree timebase whose upper four bits are encoded with the Timer Bus Control Channel Moduli Count (TBCC_MC) signal. The TBCC_MC signal is used to control the pin bus demultiplexer. This timebase select bit field allows independent control of the timebase associated with the TBCC_MC value. DTB is cleared upon reset.

Input Event Control And Status Fields

An input event is qualified by the occurrence of a specified transition on an input state bus line. Since this channel is used for a spark application only, it does not need the flexibility to program the source of the input event. The input event signal is hardwired (mask programmed) to the input status state bus line six, Cylinder Event (CYL). The input event control and status fields are responsible for selecting the input event edge, controlling the disabling of the channel, and providing input event status.

If a Cylinder Input Event and a greater-than-or-equal-to match event occur simultaneously, the greater-than-or-equal-to match event will be ignored (i.e. the associated match status bit will not be set, no edge will be generated, and the match event will have no effect on the channel operation).

The Cylinder Input Edge (CYIE) bit field defines what transition, if any, corresponds to an input event occurrence on the hardwired (mask programmed) input status state bus line, Cylinder Event (CYL). A qualified input event occurrence generated by the CYL signal is called a Cylinder Input Event. The primary purpose of the Cylinder Input Event is to signal the SIC to drive a new Output Pin Event line, with new parameters, and to force the present Output Pin Event line off (i.e. a second edge should be forced on the pin line indicated by the DMXS bit field upon a Cylinder Input Event occurrence). If the CPU is controlling the destination of the output of the SIC 40, Cylinder Input Event occurrences do not cause the SIC 40 to switch outputs to a new pin.

In Normal Spark mode, the Cylinder Input Event can cause the Timer Bus Control Channel Moduli Count (TBCC_MC) value to be decoded and used to specify the pin the SIC 40 is driving. Also, the Cylinder Input Event can cause the following events to occur: force an edge specified by the Second Edge Match Edge (SEME) bit field to the pin indicated by the DMXS bit field, trigger data transfers, and disable channel operation.

If the SIC 40 is in Repetitive Spark mode, a Cylinder Input Event occurrence forces the SIC 40 to stop generating re-sparks and a Cylinder Input Event occurrence can cause a new pin to be driven. In Repetitive Spark Mode, Cylinder Input Event occurrences affect the SIC 40 in the same manner as in Normal Spark Mode, with the following exceptions: the Re-spark First Edge Match, Re-spark Second Edge Match, and Upper Counter are disabled upon Cylinder Input Event, and the Max Dwell Match and First Re-spark First Edge Match registers are enabled upon Cylinder Input Event (and the Second Edge Match register is enabled if it was disabled by a Max Dwell Match event that truncated the normal pulse).

The Disable On Cylinder Input (DOCI) bit field selects if the SIC 40 is disabled upon a Cylinder Input Event occurrence. When set, DOCI disables all match registers, counters, and the Cylinder Input Event logic when a Cylinder Input Event occurs. When the SIC 40 is disabled, the SIC 40 does not drive output, recognize any match event, increment the counters, recognize input events, force the SIC 40 to drive a new Output Pin Event line, or transfer data. Once the SIC 40 has been disabled, the CPU must clear the Cylinder Input Status (CIS) bit, using the standard mechanism, to re-enable the channel. To ensure coherency the CIS bit will be cleared upon the setting of the DOCI bit. Also, if the SIC 40 has been disabled, clearing the DOCI bit field will re-enable the channel immediately. When the DOCI bit field is cleared, it has no effect on channel operation.

DOCI disables the channel only after the effect of the Cylinder Input Event occurrence. Therefore, as a result of a Cylinder Input Event occurrence, an output event can be generated, a capture can occur, a new pin is driven, and a transfer can occur after which the SIC 40 is disabled. If the SIC 40 is in Repetitive Spark mode and the SIC 40 is disabled, upon re-enabling the SIC 40 the First Respark Low Time Match and the Max Dwell Match registers are enabled and Upper Counter is disabled. Also, the DOCI bit can be used to simulate "one-shot" operation by disabling the SIC 40 after the SIC 40 has finished driving one Output Pin Event Bus line. DOCI is cleared upon reset.

The Cylinder Input Status (CIS) bit indicates a Cylinder Input Event has occurred since the last CPU service that cleared CIS. CIS is set when the transition selected with the CYIE bit field occurs on the hardwired (mask programmed) input status state bus line, Cylinder Event (CYL). The CIS bit is cleared by the standard mechanism and the CIS bit is also cleared upon the setting of the DOCI bit field. When the DOCI bit field is set, a CPU service to clear the CIS bit is necessary to re-enable the SIC 40 after the channel has been disabled by a Cylinder Input Event occurrence. CIS is cleared upon reset.

Match Control And Status Fields

The match control and status fields are used to control the match registers. These fields provide match output status, define the output event edge, force match events, disable match events, and determine the size of the match.

The four greater-than-or-equal-to match data registers "share" the two greater-than-or-equal-to comparators and associated bit fields. Under normal operation, the Max Dwell Match register is compared to Lower Counter and the First Re-spark First Edge Match register is compared to Upper Counter. The First Respark First Edge Match register should be disabled by software if the SIC 40 is in Normal Spark mode. During Repetitive Spark mode, a First Re-spark First Edge Match event switches the greater-than-or-equal-to comparators such that the Re-spark First Edge Match and Re-spark Second Edge Match registers are compared to the counters. A Cylinder Input Event switches the greater-than-or-equal-to comparators such that the First Re-spark First Edge Match and the Max Dwell Match registers are compared to the counters. Also, in Repetitive Spark mode, if a Max Dwell Match event truncates the present output pulse, "natural" Second Edge Match events (i.e. the match register value is equal to the selected timebase value) are prohibited from generating output edges until the next Cylinder Input Event occurrence. "Forced" Second Edge Match events are allowed to generate output edges.

A greater-than-or-equal-to match register will not assert a match event if the counter it is being compared to is disabled or stopped. Therefore, if an edge that disables a counter is driven by the SIC 40 before the greater-than-or-equal-to match register associated with that counter has matched, the associated greater-than-or-equal-to match register cannot match until the counter is re-enabled (i.e. the opposite edge is driven by the SIC 40).

The match flag bits indicate the occurrence of match events. However, the Match Flag bits do not act as status bits which require a CPU service to clear. A Match Flag bit is set upon the occurrence of a match event and remains set until the hardware clears it. These bits provide recent status of the channel without requiring the CPU to clear them after each match. Therefore, the Match Flag bits are read-only to the CPU.

SEMF and MDMF/RSEMF are cleared upon first edge output events. Since these flags indicate whether (second edge) match events have been generated by the Second Edge Match or Max Dwell Match/Re-spark Second Edge Match registers, they must be cleared on first edge output occurrences. FEMF and RFEMF are cleared upon second edge output events. Since these flags indicate whether (first edge) match events have been generated by the First Edge Match or First Re-spark First Edge Match/Re-spark First Edge Match registers, they must be cleared on second edge output occurrences. The Disable On Cylinder Input Event (DOCI) bit field has no affect on either the setting or the clearing of these bits. The Match Flag bits use the Capture Edge (CE) bit field to determine if a first edge is a rising or falling edge and if a second edge is a falling or rising edge.

The following shows which registers control each of the four Match Flag bits in the SIC 40 (the Re-spark First Edge Match register effects RFEMF and the Re-spark Second Edge Match register effects MDMF/RSEMF only in Repetitive Spark mode between a First Re-spark Off Time Match event and a Cylinder Input Event occurrence):

| FEMF - | First Edge Match |
|---|---|
| SEMF - | Second Edge Match |
| RFEMF - | First Re-spark First Edge Match/Re-spark First Edge Match |
| MDMF/RSEMF - | Max Dwell Match/Re-spark Second Edge Match |

The Match bit files are cleared upon reset.

The match status bits indicate the occurrence of match events. A Match Status bit is set upon the occurrence of a match event. The standard mechanism is used to clear the Match status bits. The following shows which registers control each of the four Match StaTus bits in the SIC 40 (the Re-spark First Edge Match register effects RFEMS and the Re-spark Second Edge Match register effects MDMS/RSEMS only in Repetitive Spark mode between a First Re-spark Off Time match event and a Cylinder Input Event occurrence):

| FEMS - | First Edge Match |
|---|---|
| SEMS - | Second Edge Match |
| RFEMS - | First Re-spark First Edge Match/Re-spark First Edge Match |
| MDMS/RSEMS - | Max Dwell Match/Re-spark Second Edge Match |

The Match Status bit fields are cleared upon reset.

The match edge bit fields select the type of output event generated for match events. Also, if the Cylinder Output Enable (COE) bit is set, the SEME bit field selects the edge generated by a Cylinder Input Event occurrence. Output Events generated by First Edge Match events, Second Edge Match events, Re-spark First Edge Match events, First Re-spark First Edge Match events, and Cylinder Input Events are driven to the Coil Drive (CDx) signal. A match register is disabled when its Match Edge bit field is cleared.

In Repetitive Spark mode, if a Max Dwell Match event truncates the present output pulse, "natural" (i.e. the match register value is equal to the selected timebase value) Second Edge Match events are prohibited from generating output edges until the next Cylinder Input Event occurrence regardless of the state of SEME. "Forced" Second Edge Match events are allowed to generate output edges as determined by SEME.

The following shows which registers are controlled by each of the three sets of the match edge bit fields in the SIC 40 (the Re-spark First Edge Match register effects RFEME only in Repetitive Spark mode between a First Re-spark Off Time match event and a Cylinder Input Event occurrence):

| FEME - | First Edge Match |
|---|---|
| SEME - | Second Edge Match |
| RFEME - | First Re-spark First Edge Match/Re-spark First Edge Match |

Match/Re-spark First Edge Match

The match edge bit fields are cleared upon reset.

Max Dwell Match Edge (MDME) determines what output edges are generated by a Max Dwell Match event on the Coil Drive (CDx) signal and the Max Dwell (MD) signal. The most significant bit of the MDME bit field selects if the Max Dwell (MD) signal (Output Status Event line seven) is toggled upon Max Dwell Match events. The two least significant bits of the MDME bit field select what edge, if any, is driven to the Coil Drive (CDx) signal (Output Pin Event lines zero through seven) upon Max Dwell Match Events. The Max Dwell Match Edge bit field is inhibited from effecting channel operation in Re-spark mode between a First Re-spark First Edge Match event and a Cylinder input Event.

Re-spark Second Edge Match Edge (RSEME) determines what edge, if any, is driven to the Coil Drive (CDx) signal (Output Pin Event lines zero through seven) upon a Re-spark Second Edge Match event. The Re-spark Second Edge Match Edge bit field is inhibited from effecting channel operation in Re-spark mode between a Cylinder Input Event and a First Re-spark First Edge Match event and in Normal Spark mode.

If the Max Dwell Match Edge/Re-spark Second Edge Match Edge bit field is cleared, the Max Dwell Match/Re-spark Second Edge Match registers are disabled. MDME/RSEME is cleared upon reset.

| MDME | | | Action Upon a Max Dwell Match |
|---|---|---|---|
| 0 | 0 | 0 | Inhibit match events and disable output events |
| 0 | 0 | 1 | Rising edge on CDx, no effect on Max Dwell signal |
| 0 | 1 | 0 | Falling edge on CDx, no effect on Max Dwell signal |
| 0 | 1 | 1 | Falling edge on CDx, no effect on Max Dwell signal |
| 1 | 0 | 0 | No edge generated on CDx, toggle Max Dwell signal |
| 1 | 0 | 1 | Rising Edge on CDx, toggle Max Dwell signal |
| 1 | 1 | 0 | Falling edge on CDx, toggle Max Dwell signal |
| 1 | 1 | 1 | Falling edge on CDx, toggle Max Dwell signal |

| RSEME | | | Type of Edge Generated |
|---|---|---|---|
| X | 0 | 0 | Inhibit match events and disable output events |
| X | 0 | 1 | Rising edge on CDx |
| X | 1 | 0 | Falling edge on CDx |
| X | 1 | 1 | Falling edge on CDx |

The force match event bit fields allow the CPU to immediately force match events by overriding the comparators. When set, force match forces a match event regardless of the associated Match Edge bit field value and regardless of a match interlock. This forced match event sets the associated match status bit, sets the associated flag bit, and forces any other action associated with the match event (i.e. if a First Re-spark First Edge Match is forced during Repetitive Spark mode, the Re-spark First Edge Match and Re-spark Second Edge Match registers would be enabled) as if the match event occurred naturally as a result of a true comparison.

If the Match Edge bit field is not cleared, the forced match event also generates an output event as programmed by the Match edge bit field. The hardware automatically clears this bit after it forces the match event (i.e. a force match bit is set only by the CPU and cleared only by the SIC 40). The only time the force match bits have no effect on operation of the SIC 40 is when they are cleared or if the SIC is disabled.

The following shows which registers are controlled by each of the four force match bits in the SIC 40 (the Re-spark First Edge Match register effect RFFEM and the Re-spark Second Edge Match register effects FMDM/RFSEM only in Repetitive Spark mode between a First Re-spark Off Time match event and a Cylinder Input Event occurrence):

| FFEM - | First Edge Match |
| FSEM - | Second Edge Match |
| RFFEM - | First Re-spark First Edge Match/Re-spark First Edge Match |
| FMDM/RFSEM - | Max Dwell Match/Re-spark Second Edge Match |

The Force Match bit fields are cleared upon reset.

The 12/16-bit match (12/16U and 12/16L) bit fields determine if the equal-to match registers compare against upper or lower 16-bits of the timer bus or only the least significant upper or lower 12-bits. Since there are degree timebases which carry cylinder information in the high order four bits, the compare operation may be only 12-bits. 12/16U controls the First Edge Match register and 12/16L controls the Second Edge Match register. 12/16U and 12/16L are cleared upon reset.

Up Counter Control And Status Fields

The up counter control and status fields are used to control the two 16-bit counters. These fields have the following effect on the counters: select the count source, control the count enable, control the stop count function, and provide increment to zero status.

The counters are compared to the greater-than-or-equal-to match registers. The counters increment provided the SIC 40 is driving a selected level to the Output Event Logic, the counters are not stopped or disabled, and the greater-than-or-equal-to match register associated with the counter has not matched. The greater-than-or-equal-to match registers will not assert match events if the counters are stopped or disabled. At initialization, the counters will not begin incrementing, regardless of the level of the pin(s) the SIC 40 is driving, until an edge has been generated by the SIC 40.

In Repetitive Spark mode, Upper Counter is disabled upon a Cylinder Input Event occurrence and is enabled by a Second Edge Match event or a Max Dwell Match event, whichever occurs first.

The counters are automatically cleared upon being enabled to increment by an output level. The counters will increment until the output level changes or the greater-than-or-equal-to match register associated with the counter asserts a true compare.

The clock bit fields, CLKU and CLKL, select one of eight clock sources from the Clock Bus for Upper Counter and Lower Counter respectively. The selected clock source increments the counter when it is enabled. The CLKU and CLKL bit fields are cleared upon reset.

The counter level bit fields, CLU and CLL, select what output event level, if any, enables the incrementing of Upper Counter and Lower Counter, respectively. The output event level is the logic state being driven to the Output Pin Event Bus by the Output Event Logic. A counter increments until the output event level changes or the greater-than-or-equal-to match register associated with the counter matches. If the most significant bit of the CLU or CLL bit field is cleared, the respective counter is disabled. In Repetitive Spark mode, Upper counter will increment, based on the level programmed by the CLU bit field, between a Second Edge Match Event or a Max Dwell Match event, whichever occurs first, and a Cylinder Input Event only. Otherwise, Upper Counter is disabled. CLU and CLL are cleared upon reset.

The counter stop bits, CSTU and CSTL, force Upper Counter and Lower Counter, respectively, to stop incrementing and hold the present count value. When the CPU sets CSTU or CSTL, the respective counter stops incrementing and does not clear the count value. Changes in the output event level have no effect on a stopped counter. The match register associated with the counter also becomes disabled. For example, if CSTU is set, First Re-spark First Edge Match (and Respark First Edge Match) is disabled. When the CSTU or CSTL bit is cleared, the counter resumes incrementing if it is enabled or holds the count value and does not increment if it is disabled. CSTU and CSTL are cleared upon reset.

The increment to zero status bits, IZSU and IZSL, indicate if a counter has overflowed since the last CPU service that cleared the increment to zero status bit. IZSU is set by the Upper Counter incrementing past a count value of $FFFF. IZSL is set by the Lower Counter incrementing past a count value of $FFFF. During normal operation, if the SIC 40 is programmed correctly, an overflow of either counter is considered an error condition that the SIC 40 cannot correct, therefore, CPU intervention is required to correct the error. The standard mechanism is used to clear the IZSU and IZSL bits. IZSU and IZSL are cleared upon reset.

Output Event Control Fields

The output event control fields are used to control the generation of output events. These fields have the following effects on the SIC 40: provide output event status, enable the generation of output events upon Cylinder Input Event occurrences, control the destination of the output event and specify the channel mode of operation.

There are two output event logic blocks in the SIC, the Toggle Event Logic and the Output Event Logic. The Output Event Logic drives output to the Output Pin Event Bus via the Pin Bus Demultiplexer. The Pin Bus Demultiplexer is used to sequentially drive up to eight different pin bus lines, the Coil Drive (CDx) signal. Output driven to the Coil Drive (CDx) signal is called coil drive output. The Output Event Logic block receives its input from all the match registers and the Cylinder Input Event.

The Toggle Event Logic drives the Max Dwell (MD) signal. Toggle Event Logic is a toggle only output event. The Toggle Event Logic receives input only from the Max Dwell Match register.

The Max Dwell Toggle Status bit, MDTS, indicates a toggle has occurred on the Max Dwell (MD) signal since the last CPU service that cleared MDTS. MDTS is set by a Max Dwell Match event only when the most significant bit in the Max Dwell Match Edge (MDME) bit field is set. The standard mechanism is used to clear the MDTS bit. MDTS is cleared upon reset.

The Cylinder Output Enable bit, COE, determines if an output event is generated upon a Cylinder Input Event occurrence. If the COE bit is set, an output edge (rising or falling), specified by the Second Edge Match Edge (SEME)

bit fields, is generated upon a Cylinder Input Event occurrence. The output events generated by Cylinder Input Events are driven to the Coil Drive (CDx) signal. If the COE bit field is cleared, Cylinder Input Event occurrences do not generate output edges. As is the case for match outputs, edges generated by a Cylinder Input Event can cause captures to occur. COE is cleared upon reset.

The Demultiplexer Control, DMXC, selects the source of the Demultiplexer Select Lines: the CPU or the Timer Bus Control Channel Moduli Count (TBCC_MC) signal. If DMXC is set, the Pin Bus Demultiplexer is updated by the TBCC_MC signal upon a Cylinder Input Event occurrence. Upon a Cylinder Input Event occurrence, the TBCC_MC signal is decoded into a mutually exclusive eight bit field and latched. This latched value specifies the pin (a Coil Drive (CDx) line) driven.

If the DMXC bit is cleared, the DMXL bits, updated by the CPU, determine the pin(s) (a Coil Drive (CDx) line or lines) that the SIC 40 drives. Cylinder Input Events and the Timer Bus Control Channel Moduli Count (TBCC_MC) output edges from the SIC 40. If a DMXS bit is clear, the corresponding pin line is not receiving output edges from the SIC 40.

If the Demultiplexer Control (DMXC) bit field is cleared, the DMXS bit field is equal to the Demultiplexer Select Lines (DMXL) bit field, i.e. whenever the CPU updates the DMXL bit field, the DMXS bit field reflects the change. If the Demultiplexer Control (DMXC) bit field is set, the DMXS bit field is updated upon Cylinder Input Events with the decoded Timer Bus Control Channel Moduli Count (TBCC_MC) value. The DMXS bit field is cleared upon reset.

The relationship between the Timer Bus Control Channel Moduli Count (TBCC_MC) value, Demultiplexer Control (DMXC) bit field, Demultiplexer Select Lines (DMXL) bit field, the Demultiplexer Select Line Status (DMXS) bit field, and the pin(s) (a Coil Drive (CDx) line or lines) driven by the SIC 40 is shown as follows:

| DMXC | TBCC_MC | | | | | | | | | Coil Drive (CDx) Line |
|---|---|---|---|---|---|---|---|---|---|---|
| 1 | | X | X | X | X DMXL | X | X | X | X | no effect on CDx signal |
| | | | | | DMXS (DMXS = Decoded TBCC_MC) | | | | | |
| 1 | 0000 | 1 | 0 | 0 | 0 | 0 | 0 | 0 | 0 | Coil Drive 0 |
| 1 | 0001 | 0 | 1 | 0 | 0 | 0 | 0 | 0 | 0 | Coil Drive 1 |
| 1 | 0010 | 0 | 0 | 1 | 0 | 0 | 0 | 0 | 0 | Coil Drive 2 |
| 1 | 0011 | 0 | 0 | 0 | 1 | 0 | 0 | 0 | 0 | Coil Drive 3 |
| 1 | 0100 | 0 | 0 | 0 | 0 | 1 | 0 | 0 | 0 | Coil Drive 4 |
| 1 | 0101 | 0 | 0 | 0 | 0 | 0 | 1 | 0 | 0 | Coil Drive 5 |
| 1 | 0110 | 0 | 0 | 0 | 0 | 0 | 0 | 1 | 0 | Coil Drive 6 |
| 1 | 0111 | 0 | 0 | 0 | 0 | 0 | 0 | 0 | 1 | Coil Drive 7 |
| | | | | | DMXL | | | | | |
| 0 | XXXX | 1 | 0 | 0 | 1 | 0 | 0 | 0 | 0 | Coil Drive 0 and Coil Drive 3 |
| | | | | | DMXS (DMXS = DMXL) | | | | | |
| 0 | XXXX | 1 | 0 | 0 | 1 | 0 | 0 | 0 | 0 | Coil Drive 0 and Coil Drive 3 | value will have no effect on the output of the SIC 40. DMXC is cleared upon reset.

The Demultiplexer Select Line bits, DMXL, are individual enable bits for each pin (a Coil Drive (CDx) line) driven by the SIC 40. The DMXL bits are only enabled when the Demultiplexer Control (DMXC) bit field is selecting CPU control of the output of the SIC 40 (i.e. DMXC cleared). When a DMXL bit is set and the DMXC bit is cleared, the corresponding pin (a Coil Drive (CDx) line) is driven by the SIC 40 (i.e. if DMXC is cleared and DMXL(0) is set, then the SIC is driving pin 0 (Coil Drive line 0 (CD0)). When a DMXL bit is cleared and DMXC is cleared, the corresponding pin (a Coil Drive (CDx) line) is not driven by the SIC 40.

If DMXC is set, these bits are ignored by the SIC 40. Also, the TBCC_MC signal is decoded into a mutually exclusive eight bit field which determines the pin being driven, i.e. only one output is driven. The DMXL bit field is cleared upon reset.

The Demultiplexer Select Line Status bits, DMXS, are eight read-only bits that reflect the state of the demultiplexer select lines. The DMXS bits indicate the output pin lines to which the SIC 40 is generating output. There is one DMXS bit for each output pin line the SIC 40 is capable of driving. If a DMXS bit is set, the corresponding pin line is receiving The repetitive spark bit, RS, determines if the channel is in Normal Spark mode or Repetitive Spark mode. In Repetitive Spark mode several registers operate differently than in Normal Spark mode based on the Second Edge Match events, Max Dwell Match events, First Re-spark First Edge Match events, and Cylinder Input Event occurrences.

In Repetitive Spark mode:

The Max Dwell Match register optionally drives output to the Max Dwell (MD) signal and the Coil Drive (CDx) signal, based on the values of Max Dwell Match Edge (MDME). The First Re-spark First Edge Match register drives output to the Coil Drive (CDx) signal. The Re-spark Second Edge Match and Re-spark First Edge Match registers drive output to the Coil Drive (CDx) signal.

Upper Counter will be enabled to increment (assuming the Counter Level Upper bit field is programmed to increment Upper Counter when the SIC 40 is driving the inactive level) upon a Second Edge Match event or a Max Dwell Match event, whichever occurs first.

Upon the occurrence of a First Re-spark First Edge Match: the Max Dwell Match and the First Re-spark First Edge Match registers are disabled and the Re-spark Second Edge Match and the Re-spark First Edge Match registers are enabled.

Upon the occurrence of Cylinder Input Event: Upper Counter is disabled, Re-spark First Edge Match and Re-spark Second Edge Match are disabled, and First Re-spark First Edge Match and Max Dwell Match are enabled. The COE bit field should be set, enabling the generation of a second edge upon a Cylinder Input Event occurrence.

In Repetitive Spark mode, if a Max Dwell Match event occurs and generates a second edge, the Second Edge Match register is prohibited from generating output edges based on "natural" (i.e. the match register value is equal to the selected timebase value) match events (i.e. not forced match events) until the next Cylinder Input Event occurrence.

Upon setting the RS bit, the SIC 40 will begin generating re-sparks upon the next Second Edge Match event or Max Dwell Match event that generates a falling edge, i.e. if the RS bit is set after a Max Dwell Match event that generated a second edge but before a Second Edge Match event, re-sparks will not be generated upon the Second Edge Match occurrence. Upon clearing the RS bit, the SIC 40 disables the re-spark greater-than-or-equal-to match registers upon the next Cylinder Input Event.

When setting the RS bit, the Counter Level Upper (CLU) should be simultaneously written to allow Upper Counter to count while the SIC 40 is driving the inactive state. When clearing the RS bit field, the Counter Level Upper (CLU) bit field should be cleared, disabling upper counter. Clearing CLU when clearing RS immediately stops the generation of re-sparks, but the re-spark greater-than-or-equal-to match registers are still enabled until the next Cylinder Input Event occurrence. RS is cleared upon reset.

Operation Of The Spark Integrated Channel

The SIC 40 produces up to eight spark output waveforms used to control automobile ignition coils 36. The following description describes how the SIC 40 operates to produce spark waveforms by describing the interaction between the registers and the control logic.

In order for the SIC 40 to produce output waveforms, the following match functions are used: absolute match and relative match. The absolute match is generated by a time or angle value compared against the Timer Bus. The First Edge Match and the Second Edge Match perform absolute matches. The relative match is generated by a time or angle value compared against the counters. Since the counters are triggered by output levels and the output levels are generated by match events, the relative match measures an amount of time or angle after an edge has been generated by the SIC 40.

The Max Dwell Match, First Re-spark First Edge Match, Re-spark First Edge Match, and Re-spark Second Edge Match registers perform relative matches.

To produce a spark output waveform the following values should be written to the designated register:

The first edge absolute time or angle is placed in the First Edge Match register.

The second edge absolute time or angle is placed in the Second Edge Match register.

The values to be used to generate the next first and second edges are placed in the Next First Edge and Next Second Edge registers, which are transferred into the match registers upon a Cylinder Input Event occurrence.

The max dwell relative time value should be placed in the Max Dwell Match register.

For Repetitive Spark Mode:

The first re-spark off relative time is placed in the First Re-spark First Edge Match register.

The second re-spark off relative time is placed in the Re-spark First Edge Match register.

The re-spark on relative time is placed in the Re-spark Second Edge Match register.

The time or angle that the first and second edge of the output pulse actually occur is stored in the First Edge Capture and Second Edge Capture registers. The counters are local timebases used for relative match timing, and should not be written under normal circumstances.

When the Pin Bus Demultiplexer of the SIC 40 is controlled automatically (i.e. the Demultiplexer Control (DMXC) bit field is set), only one output pin event line is active at a time. The Cylinder Input Event and the Timer Bus Control Channel Moduli Counter (TBCC_MC) value control which pin is active. Upon a Cylinder Input Event, the Timer Bus Control Channel Moduli Count value is decoded into a mutually exclusive eight bit field and latched. This latched value determines what pin the SIC 40 is driving.

When the Max Dwell Match register matches, it can cause a toggle to the status line (Max Dwell (MD) signal) and optionally force an edge to the pin (a Coil Drive (CDx) line) driven by the SIC 40.

The Match and Capture Flag bit fields indicate the state of the SIC 40. The CPU can read the Match and Capture Flag bits to determine at what point the SIC 40 is driving the output pulse. The following Table is a sample of the kind of state information the CPU can derive from the Match Flag bits:

| FEMF | SEMF | MDMF/ RFEMF | RSEMF | Indicates: |
| --- | --- | --- | --- | --- |
| 0 | 0 | 0 | 0 | Initialization, or the Cylinder Input Event truncated the output pulse. |
| 0 | 0 | 0 | 1 | Max Dwell Match occurred and forced a second edge or re-spark pulse off time. |
| 0 | 0 | 1 | 0 | Re-spark pulse on time |
| 0 | 0 | 1 | 1 | Not a possible combination except if a Force Match occurred. |
| 0 | 1 | 0 | 0 | Normal pulse off. |
| 0 | 1 | 0 | 1 | A Max Dwell Match and a Second Edge Match occurred. |
| 0 | 1 | 1 | X | Not a possible combination except if a Force Match/Simultaneous Match occurred. |
| 1 | 0 | 0 | 0 | Normal pulse on. |
| 1 | 0 | 0 | 1 | Normal pulse high and a Max Dwell Match has occurred but did not force a second edge. |
| 1 | 0 | 1 | X | Not a possible combination except if a Force Match occurred. |

| | | MDMF/ | | |
|---|---|---|---|---|
| FEMF | SEMF | RFEMF | RSEMF | Indicates: |
| 1 | 1 | X | X | Not a possible combination except if a Force Match/Simultaneous Match occurred. |

Normal Spark Mode

In the Normal Spark mode, the SIC 40 continuously produces one output pulse per Cylinder Input Event. The equal-to match registers, capture registers, holding registers, Lower Counter, and Max Dwell Match register are used. The equal-to match registers are always enabled and, therefore, always generating rising and falling edges. The capture registers capture selected timebases when a specified edge is output. Lower Counter increments when the selected output level is being generated by the SIC 40 and stops incrementing when the output level changes or a Max Dwell Match occurs. The Max Dwell Match register only generates match events when Lower Counter is enabled. A First Edge Match causes a rising edge, a Second Edge Match causes a falling edge, and the Lower Counter counts while high.

Repetitive Spark Mode

In the Repetitive Spark mode, the SIC 40 continuously produces more than one output pulse per Cylinder Input Event. In this mode, a normal spark output pulse is generated as described above. A specified time after the normal spark output pulse, determined by the value in the First Re-spark First Edge Match register, several small pulses are generated until a Cylinder Input Event occurrence. The small output pulses are a duty cycle output whose off time is specified by the value in the Re-spark First Edge Match register and the on time is specified by the value in the Re-spark Second Edge Match register.

In order to prevent erroneous matches, Upper Counter, whose count value is compared to the First Re-spark First Edge Match value and the Re-spark First Edge Match value is enabled upon a Second Edge Match or a Max Dwell Match event that generates a falling edge and disabled upon a Cylinder Input Event. When Upper Counter is enabled, it counts when the selected output level is being driven by the Output Event Logic and it is disabled when the opposite level is being driven or when it's associated greater-than-or-equal-to match register matches. Also, in Repetitive Spark Mode, if a Max Dwell Match event occurs and generates a second edge, the Second Edge Match register is prohibited from generating output based on a "natural" match event (i.e. the match register value is equal to the selected timebase value) until the next Cylinder Input Event occurrence. In this situation, the Second Edge Match register can only generate an output edge if it is forced via the Force Second Edge Match (FSEM) bit field.

The capture registers capture selected timebases when a specified edge causes a pin line transition. Usually in Repetitive Spark mode, only the first and second edges of the normal output pulse need to be captured, i.e. the re-spark pulse edges should not trigger captures. In this case, the capture registers should be configured for normal pulse captures.

Referring again to FIG. 6, a First Edge Match causes a rising edge, a Second Edge Match causes a falling edge. The Upper Counter is only enabled to count between a Second Edge Match event and a Cylinder Input Event. Upper Counter, when enabled, increments while the output level is low and the associated greater-than-or-equal-to match register has not matched. Lower Counter counts while the output level is high and the associated greater-than-or-equal-to match register has not matched. The position of the Max Dwell Match is shown where it would occur if the Second Edge Match event does not occur. If the Max Dwell Match does occur and generates a second edge, the Second Edge Match register is prohibited from generating output events until the Cylinder Input event). The First Re-spark First Edge Match and the Re-spark First Edge Match cause rising edges, the Re-spark Second Edge Match causes falling edges, and the Cylinder Input Event causes falling edges.

While the best modes for carrying out the invention have been described in detail, those familiar with the art to which this invention relates will recognize various alternative designs and embodiments for practicing the invention as defined by the following claims.

What is claimed is:

1. A method for generating an ignition coil output signal utilizing a processor to control charging and discharging of a plurality of ignition coils in an internal combustion engine, the method comprising:

providing a plurality of memory-mapped holding registers adapted to asynchronously receive a plurality of ignition coil data from the processor and for storing the plurality of ignition coil data until subsequent ignition coil data is received from the processor;

providing a plurality of match registers coupled to the plurality of holding registers for comparing the ignition coil data with a reference signal;

determining a position of the engine and generating a corresponding engine position signal; and generating the ignition coil control output signal for receipt by one of the plurality of ignition coils based on the comparison and the engine position signal.

2. The method as recited in claim 1 wherein the plurality of ignition coil data includes a first edge value and wherein the step of comparing the ignition coil data with the reference signal includes the step of comparing the first edge value with the reference signal and wherein the step of generating the ignition coil output signal includes the step of generating a first edge of the ignition coil output signal.

3. The method as recited in claim 2 wherein the step of comparing the first edge value with the reference signal is performed upon the occurrence of a predetermined event.

4. The method as recited in claim 2 wherein the plurality of ignition coil data further includes a second edge value and a dwell time-out value and wherein the step of comparing the ignition coil data with the reference signal includes the step of comparing the second edge value with the reference signal and comparing the dwell time-out value with a second reference signal in response to the generation of the first edge of the ignition coil output signal and wherein the step of generating the ignition coil output signal further includes the step of generating a second edge of the ignition coil output signal based on a match between one of the reference signal and the second edge value and the second reference signal and the dwell time-out value.

5. The method as recited in claim 4 wherein the second reference signal is a first timer signal initiated upon the generation of the first edge of the ignition coil output signal.

6. The method as recited in claim 5 further comprising the step of generating a plurality of repetitive ignition coil output signals each having a predetermined duty cycle.

7. The method as recited in claim 6 wherein the plurality of ignition coil data further includes a minimum off time value and wherein the method further comprises the step of initiating a second timer signal upon generating the second edge of the ignition coil output signal.

8. The method as recited in claim 7 wherein the step of generating the plurality of repetitive ignition coil output signals includes the step of generating the plurality of repetitive ignition coil output signals when the minimum off time value matches the second timer signal.

9. The method as recited in claim 1 wherein the reference signal is a time timebase signal.

10. The method as recited in claim 1 wherein the reference signal is a degree timebase signal.

11. The method as recited in claim 1 wherein the step of providing the plurality of memory-mapped holding registers includes the step of sensing a predetermined event and wherein the plurality of memory-mapped holding registers receive the subsequent fuel pulse data from the processor upon the processor sensing the predetermined event.

12. The method as recited in claim 1 further comprising the step of providing a plurality of capture holding registers for capturing a timebase upon the occurrence of a match between the reference signal and the plurality of ignition coil data.

13. A system for generating an ignition coil output signal utilizing a processor to control charging and discharging of a plurality of ignition coils in an internal combustion engine, the system comprising:

a plurality of holding registers adapted to asynchronously receive a plurality of ignition coil data from the processor;

a plurality of match registers coupled to the plurality of holding registers for comparing the plurality of ignition coil data with a reference signal and for generating an ignition coil output signal based on the comparison between the ignition coil data and the reference signal;

a sensing device for determining a position of the engine and generating a corresponding engine position signal; and wherein the plurality of storage devices are memory-mapped and store the plurality of ignition coil data until subsequent ignition coil data is received from the processor.

14. The system as recited in claim 13 wherein the plurality of ignition coil data includes a first edge value and wherein the plurality of match registers compare the first edge value with the reference signal and generate a first edge of the ignition coil output signal.

15. The system as recited in claim 14 wherein the plurality of ignition coil data further includes a second edge value and a dwell time-out value and wherein the plurality of match registers compare the second edge value with the reference signal, compare the dwell time-out value with a second reference signal in response to the generation of the first edge of the ignition coil output signal and generate a second edge of the ignition coil output signal based on a match between one of the reference signal and the second edge value and the second reference signal and the dwell time-out value.

16. The system as recited in claim 15 wherein the plurality of match registers further generate a plurality of repetitive ignition coil output signals each having a predetermined duty cycle.

17. The system as recited in claim 16 wherein the plurality of ignition coil data further includes a minimum off time value and wherein the system includes a timer for initiating a timer signal upon generating the second edge of the ignition coil output signal.

18. The system as recited in claim 17 wherein the plurality of match registers generate the plurality of repetitive ignition coil output signals when the minimum off time value matches the timer signal.

19. The system as recited in claim 13 wherein the plurality of memory-mapped holding registers receive the subsequent ignition coil data from the processor upon the processor sensing a predetermined event.

20. The system as recited in claim 13 further comprising a plurality of capture holding registers for capturing a timebase upon the occurrence of a match between the reference signal and the plurality of ignition coil data.

* * * * *